United States Patent
Lee et al.

(10) Patent No.: US 9,789,731 B2
(45) Date of Patent: Oct. 17, 2017

(54) HYBRID FIBER CORD AND METHOD FOR MANUFACTURING THE SAME

(71) Applicant: KOLON INDUSTRIES, INC., Gwacheon-si, Gyeonggi-do (KR)

(72) Inventors: Min Ho Lee, Gumi-si (KR); Ok Wha Jeon, Daegu (KR); Il Chung, Daegu (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 1 day.

(21) Appl. No.: 14/438,294

(22) PCT Filed: Dec. 23, 2013

(86) PCT No.: PCT/KR2013/012013
§ 371 (c)(1),
(2) Date: Apr. 24, 2015

(87) PCT Pub. No.: WO2014/104680
PCT Pub. Date: Jul. 3, 2014

(65) Prior Publication Data
US 2015/0292124 A1    Oct. 15, 2015

(30) Foreign Application Priority Data

Dec. 27, 2012 (KR) .................. 10-2012-0154933

(51) Int. Cl.
*B60C 9/00* (2006.01)
*D02G 3/48* (2006.01)
(Continued)

(52) U.S. Cl.
CPC ............. *B60C 9/005* (2013.01); *D02G 3/047* (2013.01); *D02G 3/404* (2013.01); *D02G 3/48* (2013.01);
(Continued)

(58) Field of Classification Search
CPC ........ D02G 3/045; D02G 3/047; D02G 3/404; D02G 3/48
See application file for complete search history.

(56) References Cited

U.S. PATENT DOCUMENTS

| 5,321,960 A | 6/1994 | Whitt et al. |
| 2003/0159768 A1 | 8/2003 | Fritsch et al. |

(Continued)

FOREIGN PATENT DOCUMENTS

| CN | 1930335 A | 3/2007 |
| CN | 101200827 A | 6/2008 |

(Continued)

*Primary Examiner* — Shaun R Hurley
(74) *Attorney, Agent, or Firm* — Birch, Stewart, Kolasch & Birch, LLP

(57) ABSTRACT

Disclosed are a hybrid fiber cord comprising a nylon filament and an aramid filament, the cord having more uniform physical properties and better strength and fatigue properties and being able to be made more easily than the conventional hybrid fiber cords such that it can be used to make an ultra high performance tire, and a method for manufacturing the same. The hybrid fiber cord comprises a nylon primarily-twisted yarn having a first twist number, and an aramid primarily-twisted yarn having a second twist number. The first twist number is identical with the second twist number. The nylon and aramid primarily-twisted yarns are secondarily-twisted together to have identical structures with each other.

7 Claims, 1 Drawing Sheet

(51) Int. Cl.
*D02G 3/04* (2006.01)
*D02G 3/40* (2006.01)

(52) U.S. Cl.
CPC .. *B60C 2009/0092* (2013.01); *D10B 2331/02* (2013.01); *D10B 2331/021* (2013.01)

(56) References Cited

U.S. PATENT DOCUMENTS

| | | |
|---|---|---|
| 2004/0221937 A1 | 11/2004 | Dehnert et al. |
| 2005/0204718 A1 | 9/2005 | Zhu et al. |
| 2009/0090447 A1* | 4/2009 | Baldwin, Jr. ......... B60C 9/0042 152/451 |
| 2009/0139625 A1 | 6/2009 | Harikae et al. |
| 2009/0139626 A1 | 6/2009 | Ozaki et al. |
| 2010/0154962 A1* | 6/2010 | Gillard ................ B60C 9/263 152/532 |
| 2010/0224298 A1 | 9/2010 | Rampana et al. |
| 2013/0171450 A1 | 7/2013 | Zimmerer et al. |
| 2014/0069563 A1* | 3/2014 | Le Clerc ................ D02G 3/48 152/527 |
| 2014/0206809 A1* | 7/2014 | Miyazaki ................ C08L 7/00 524/432 |
| 2014/0237983 A1* | 8/2014 | Love ........................ D02G 3/48 57/238 |
| 2014/0238524 A1* | 8/2014 | Love ........................ D01H 7/00 138/118 |

FOREIGN PATENT DOCUMENTS

| | | |
|---|---|---|
| CN | 101403154 A | 4/2009 |
| CN | 101835632 A | 9/2010 |
| EP | 1106390 A1 | 6/2001 |
| EP | 1475248 A1 | 11/2004 |
| EP | 1878591 A2 | 1/2008 |
| EP | 2065222 A1 | 6/2009 |
| EP | 2065223 A1 | 6/2009 |
| JP | 61-71204 A | 4/1986 |
| JP | 4-2832 | 1/1992 |
| JP | 5-195359 A | 8/1993 |
| JP | 7-232511 A | 9/1995 |
| JP | 8-244404 A | 9/1996 |
| JP | 2009-091713 A | 12/2006 |
| JP | 2008-106405 A | 5/2008 |
| JP | 2009-68549 A | 4/2009 |
| JP | 2009-127149 A | 6/2009 |
| JP | 2009-132324 A | 6/2009 |
| JP | 2009-132329 A | 6/2009 |
| JP | 2011-500427 A | 1/2011 |
| KR | 10-2006-0126101 A | 12/2006 |
| WO | WO 2012/017034 A1 | 2/2012 |

\* cited by examiner

HYBRID FIBER CORD AND METHOD FOR MANUFACTURING THE SAME

TECHNICAL FIELD

The present invention relates to a hybrid fiber cord and a method for manufacturing the same, and more particularly, to a hybrid fiber cord comprising a nylon filament and an aramid filament, the cord having more uniform physical properties and better strength and fatigue resistance and being able to be made more easily than the conventional hybrid fiber cords such that it can be used to make an ultra high performance tire, and a method for manufacturing the same.

BACKGROUND ART

A fiber cord, particularly a fiber cord treated with an adhesive, are widely used as a reinforcement for the rubber products such as tires, conveyor belts, V-belts, hoses and so on. The fiber cord may be made of nylon fibers, polyester fibers, rayon fibers and the likes. Among the important methods for improving the performance of the final rubber products is to improve the physical properties of the fiber cords which are used as the reinforcements therefor.

As the performance of an automobile and road condition are improved, the driving speed is getting higher. Thus, lots of studies are made about a tire cord to be used as a reinforcement for a tire rubber so as to maintain the stability and durability of the tire even during a high speed driving.

A tire cord may be divided into multiple portions based on their functions, i.e., a carcass portion to support the entire tire, a belt portion to support the load and to prevent any deformation that might be caused when a high speed driving is made, and a cap ply portion to prevent any deformation of the belt portion. As the driving speed is getting higher due to the improvement of the highway conditions, the deformation of the belt portion of the tire cord occurs thereby causing the degradation of the riding quality. Thus, the cap ply portion to prevent the deformation of the belt portion is getting more important.

The materials mainly used now for the cap ply are nylon and aramid. The nylon are used for most kinds of the tires since it is less expensive and has higher adhesiveness both before and after fatigue compared to other materials. Furthermore, the nylon has high shrinkage stress which the cap ply is required to have to advantageously support the belt cord during a high speed driving. However, the nylon has drawbacks as a material for a cap ply in that a flat spot might be caused due to its low modulus and high changeability between room temperature and high temperature.

The aramid, one of the materials other than nylon for the cap ply, causes little flat spot problem, i.e., tire deformation after long-term parking, because, although having lower shrinkage stress than nylon, it has good creep property and very high modulus, and exhibits only small difference in modulus between room temperature and high temperature. While having been used for the high-class tires for which the quality of tire is very important, such aramid material cannot be used for the general tires as a practical matter because it is very expensive. Furthermore, since the high modulus of the aramid makes it difficult to expand the tire during the tire forming and curing processes, it is hard to apply the aramid material to the general tires. It has also a disadvantage in that its elongation at break is too low to secure sufficient fatigue resistance, i.e., long-term durability.

To compensate for the aforementioned drawbacks, a hybrid structure has been developed which comprises both nylon and aramid. In most hybrid structures, however, the primary twist numbers of the nylon and aramid primarily-twisted yarns and the secondary twist number of a ply yarn are different from one another because of the big difference between the physical properties of the nylon and aramid. Although such structure can solve the expansion-related problem during the tire-manufacturing process and the fatigue durability problem as well, since it requires the primarily-twisted yarns of different twist numbers as well as the ply yarn to be manufactured separately with different ring twisters or special twisters, it has such limitations as low productivity, high variability of the physical properties due to its unstable structure, high defect rate, and the like.

More particularly speaking, since the conventional hybrid fiber cord comprises the nylon and aramid primarily-twisted yarns having different twist numbers respectively and they are secondarily-twisted at further different twist number, the physical properties of the entire hybrid fiber cord cannot but be affected dominantly by the twist numbers of the primary and secondary twists.

According to the conventional method, as schematically illustrated in FIG. 1, when the nylon primarily-twisted yarn 11 and aramid primarily-twisted yarn 12 are secondarily twisted together to form the ply yarn 10, the nylon primarily-twisted yarn 11 is covered by the aramid primarily-twisted yarn 12. Thus, when the ply yarn 10 is dried and heat-treated after it is submerged into an adhesive solution, significant friction between the ply yarn 10 and the guides and rollers occurs thereby sweeping the aramid primarily-twisted yarn 12 which covers the nylon primarily-twisted yarn 11 to form a loop, and/or the nylon primarily-twisted yarn 11 shrinks causing the shape non-uniformity.

The loop and shape non-uniformity make the properties of the hybrid fiber cords non-uniform and cause defective products.

DISCLOSURE OF INVENTION

Technical Problem

Therefore, the present invention is directed to a hybrid fiber cord and a method for manufacturing the same capable of preventing these limitations and drawbacks of the related art.

An aspect of the present invention is to provide a hybrid fiber cord comprising a nylon filament and an aramid filament, which can be made more easily and has more uniform physical properties and better strength and fatigue resistance than the conventional hybrid fiber cords such that it can be used to make an ultra high performance tire.

The other aspect of the present invention is to provide a method for easily manufacturing a hybrid fiber cord comprising a nylon filament and an aramid filament, which has more uniform physical properties and better strength and fatigue resistance than the conventional hybrid fiber cords such that it can be used to make an ultra high performance tire.

Additional aspects and features of the present invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims.

Solution to Problem

In accordance with the aspect of the present invention, there is provided a hybrid fiber cord comprising: a nylon primarily-twisted yarn having a first twist number; and an aramid primarily-twisted yarn having a second twist number, wherein the first twist number is identical with the second twist number, and the nylon primarily-twisted yarn and aramid primarily-twisted yarn are secondarily-twisted together to have identical structures with each other.

In accordance with the other aspect of the present invention, there is provided a method for manufacturing a hybrid fiber cord, the method comprising: a first step for primarily-twisting a nylon filament at a first twist number to produce a nylon primarily-twisted yarn; a second step for primarily-twisting an aramid filament at a second twist number to produce an aramid primarily-twisted yarn; and a third step for secondarily-twisting the nylon and aramid primarily-twisted yarns together to produce a ply yarn in such a way that the nylon and aramid primarily-twisted yarns have identical structures with each other, wherein the first twist number is identical with the second twist number.

It is to be understood that both the foregoing general description and the following detailed description of the present invention are exemplary and explanatory and are intended to provide further explanation of the invention as claimed.

Advantageous Effects of Invention

According to the present invention, the process for manufacturing the hybrid fiber cord can be simplified and various apparatuses can be used since the twist number of the nylon primarily-twisted yarn is identical with that of the aramid primarily-twisted yarn.

Furthermore, by controlling the tensions applied to the nylon and aramid primarily-twisted yarns respectively during the twisting process to make them have identical structure with identical twist number, the present invention can achieve more stable structure than one in which the nylon primarily-twisted yarn is covered by the aramid primarily-twisted yarn. Consequently, the property variableness and defect rate of the hybrid fiber cord can be reduced, and a hybrid fiber cord of improved strength and fatigue resistance which is useful for the cap ply of the tire for high speed driving can be provided.

Other advantages of the present invention will be described below in detail together with the related technical features.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR THE INVENTION

Figure 1:
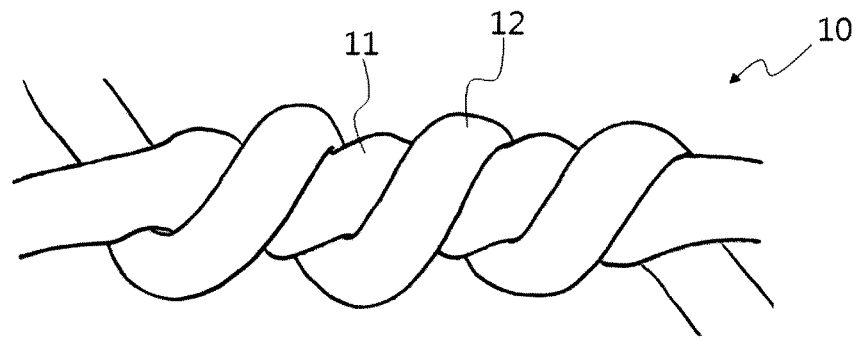
FIG. 1 schematically shows a ply yarn constituting a conventional hybrid fiber cord, and FIG. 2 schematically shows a ply yarn constituting a hybrid fiber cord of the present invention.

Those skilled in the art will appreciate that various modifications, additions and substitutions are possible, without departing from the scope and spirit of the invention. Accordingly, the present invention includes all alternations and modifications that fall within the scope of inventions described in claims and equivalents thereto.

The primary twisting may be performed by twisting a filament in counterclockwise direction, i.e., Z-direction, and the secondary twisting may be performed by twisting the primarily-twisted yarns together in clockwise direction, i.e., S-direction.

The term ply yarn as used herein refers to a yarn made by secondarily twisting two or more primarily-twisted yarns together, which may also be called raw cord.

The term fiber cord as used herein refers to a ply yarn containing an adhesive so that it can be applied to a rubber product at firsthand, which may also be called dipped cord. The fiber cord also include a fabric containing an adhesive, which may made by weaving a fabric with the ply yarns and then dipping the fabric into an adhesive solution.

The term twist number as used herein refers to the number of twist per 1 m, and the measure of the twist number is TPM (Twist Per Meter).

The hybrid fiber cord of the present invention comprises a nylon filament and an aramid filament. The weight ratio of the nylon primarily-twisted yarn to the aramid primarily-twisted yarn may be 20:80 to 80:20.

The hybrid fiber cord of the present invention comprises a 2-ply yarn and an adhesive coated thereon, wherein the 2-ply yarn is made by primarily twisting the nylon and aramid filaments respectively at the same twist number to produce nylon and aramid primarily-twisted yarns and then secondarily twisting the nylon and aramid primarily-twisted yarns together.

The hybrid fiber cord of the present invention has breaking tenacity of 8.0 to 15.0 g/d, elongation at break of 7 to 15%, and dry heat shrinkage of 1.5 to 2.5%, the breaking tenacity and elongation at break being measured according to ASTM D885.

The difference between the maximum and minimum breaking tenacities of the hybrid fiber cords made according to the present invention under the same conditions is less than 1 g/d, and the difference between the maximum and minimum elongations at break of the hybrid fiber cords made according to the present invention under the same conditions is less than 3%.

The hybrid fiber cord of the present invention has strength retention rate of 80% or more after the disc fatigue test performed according to JIS-L 1017 method of Japanese Standard Association.

According to one embodiment of the present invention, the hybrid fiber cord is manufactured through a method comprising a) simultaneously performing a primary twisting and a secondary twisting at the same twist number with the nylon and aramid filaments by means of a twister which is capable of performing the primary and secondary twisting processes simultaneously, e.g., Cable Corder™, to produce a ply yarn, and b) submerging the ply yarn into an adhesive solution and performing drying and heat-treating processes sequentially.

Hereinafter, the present invention will be explained in more detail.

According to the hybrid fiber cord of the present invention which comprises the nylon and aramid filaments of high adhesiveness, heat resistance and fatigue resistance, the aramid filament redeems the low modulus of the nylon filament and the nylon filament redeems the low shrinkage of the aramid filament. The hybrid fiber cord of the present invention is competitive in terms of price.

The cap ply of a tire to which the hybrid fiber cord of the present invention is applicable is a special cord fabric to be attached to a belt made of a steel wire or a fabric fiber. The special cord fabric improves the driving performance of a car and prevents the belt from breaking away. The hybrid fiber cord needs to be made in consideration of both the material aspects such as the properties of the nylon and aramid filaments and the process aspects such as twist number and sequence of twisting.

The nylon includes amide groups having strong polarity in the main chain and is a crystalline polymer having tacticity and symmetry. The nylon filament for the fiber cord preferably has the properties appropriate for the fiber cord which include, but not limited to, tensile strength of 8.0 g/d or more and elongation at break of 17% or more. The tensile strength lower than the aforementioned scope requires more cords to be used thereby increasing the weight of the tire and cannot prevent the movement of the belt sufficiently during driving. The elongation at break lower than the aforementioned scope makes the fatigue of the tire after continuous driving significant, thereby causing the strength degradation.

The nylon filament which can be used for the present invention may be selected from the group consisting of nylon 6, nylon 66 and nylon 6.10, and, preferably, is nylon 66.

The aramid is a kind of the nylon-based polymer and has phenyl rings between the amide groups in the main chain such that its modulus is more than 10 times higher than that of the nylon. The aramid can be classified into para-type and meta-type based on how the phenyl rings are connected to the amide groups. It is desirable to use poly(p-phenylene-terephthalamide) expressed by the following Formula 1:

<Formula 1>

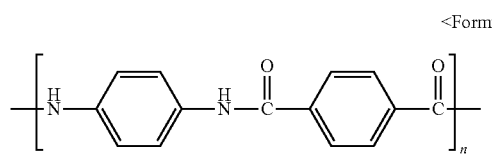

wherein n is determined based on the molecular weight of the aramid, and not limited to any specific number in the present invention.

Owing to the laminated structure of the phenyl rings, the aramid filament which is used mainly as a fiber has high crystallinity, good thermal stability, and very high modulus. For the aramid filament to be used for manufacturing a fiber cord, it is desirable that it has tensile strength of 20 g/d or more and elongation at break of 3.0% or more. If the tensile strength is lower than the aforementioned scope, the low strength of the nylon filament cannot be redeemed, and thus the fiber cord cannot sufficiently perform the supporting function within the tire.

The properties of the hybrid fiber cord of the present invention can be adjusted in accordance with the mixture ratio of the nylon and aramid filaments. The mixture ratio is determined in such a way that the properties required to the hybrid fiber cord can be satisfied and the drawbacks of each filament can be redeemed sufficiently. Generally, since the aramid filament has modulus about 10 times higher than that of the nylon filament, even the hybrid fiber cord including about 15 wt. % of aramid filaments in addition to the nylon filaments has modulus two to three times higher than that of the fiber cord consisting only of the nylon filaments, and thus can significantly reduce the flat spot problem. According to the present invention, however, in consideration of the properties of the fiber cord as well as the costs, the hybrid fiber cord comprises 20 to 80 wt. % of nylon filaments and 80 to 20 wt. % of aramid filaments.

If too much nylon filaments are used, the final hybrid fiber cord follows the properties of the nylon filament and cannot avoid the flat spot problem. On the other hand, if too much aramid filaments are used, the shrinkage force of the hybrid fiber cord becomes too low to prevent the movement of the belt cord during driving and the manufacturing cost increases.

The nylon primarily-twisted yarn and aramid primarily-twisted yarn of the hybrid fiber cord have the same twist number. Generally, as the twist number of an yarn increases, the strength thereof decreases and the fatigue resistance increases. On the other hand, as the twist number decreases, the strength increases and the fatigue resistance decreases.

Figure 2:
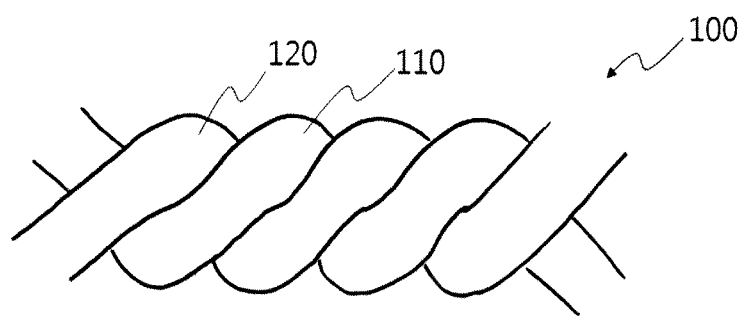

According to the present invention, as illustrated in FIG. 2, the two kinds of the primarily-twisted yarns have not only the same twist number but also the same structure such that the strength and fatigue resistance of the hybrid fiber cord can show the similar behaviors. The twist number of the nylon primarily-twisted yarn 110 and aramid primarily-twisted yarn 120 is determined based on the fineness of the nylon filament.

The nylon primarily-twisted yarn 110 and aramid primarily-twisted yarn 120 of the hybrid fiber cord according to the present invention have the same twist number of 300 to 500 TPM. For example, if the total fineness of the nylon filament is 840 denier, the proper twist number of the nylon primarily-twisted yarn 110 and aramid primarily-twisted yarn 120 is 470 TPM, and if the total fineness of the nylon filament is 1890 denier, the proper twist number of the nylon primarily-twisted yarn 110 and aramid primarily-twisted yarn 120 is 300 TPM.

It is desirable that the aramid filament has fineness identical to or similar with that of the nylon filament.

Hereinafter, the method of the present invention for manufacturing the hybrid fiber cord will be described in more detail.

The hybrid fiber cord of the present invention is manufactured by simultaneously performing a process of primary twisting the nylon and aramid filaments respectively and a process of secondary twisting the nylon primarily-twisted yarn 110 and aramid primarily-twisted yarn 120 together which are produced through the primary twisting process, then submerging the ply yarn 100 produced through the primary and secondary twisting processes into an adhesive solution, and then performing drying and heat-treating processes sequentially.

The twisting process of the present invention is significantly different from the conventional twisting process which produces primarily-twisted yarns with filaments respectively and then produces a ply yarn by secondarily twisting the primarily-twisted yarns. That is, according to the present invention, the ply yarn 100 is manufactured through a continuous-type process where the primary twisting and secondary twisting are performed simultaneously such that the productivity of the hybrid fiber cord can be increased compared to the conventional batch-type process where the primary twisting of the nylon filament and primary twisting of the aramid filament are performed by different twisters to produce the nylon primarily-twisted yarn and aramid primarily-twisted yarn separately and then the secondary twisting of the nylon and aramid primarily-twisted yarns together is performed.

As explained above, since the conventional hybrid fiber cord comprises the nylon primarily-twisted yarn 11 and aramid primarily-twisted yarn 12 both of which have different twist numbers respectively and are secondarily-twisted at further different twist number, the physical properties of the entire hybrid fiber cord cannot but be affected dominantly by the twist numbers of the primary and secondary twists. Further, the secondary twisting of the nylon primarily-twisted yarn 11 and aramid primarily-twisted yarn 12 together cannot but produce a ply yarn 10 in such a shape that the nylon primarily-twisted yarn 11 is covered by the aramid primarily-twisted yarn 12. Thus, when the ply yarn 10 is dried and heat-treated after it is submerged into an adhesive solution, significant friction between the ply yarn 10 and the guides and rollers occurs thereby sweeping the aramid primarily-twisted yarn 12 covering the nylon primarily-twisted yarn 11 to form a loop, and the nylon primarily-twisted yarn 11 shrinks causing the shape non-uniformity. The loop and shape non-uniformity make the properties of the hybrid fiber cords non-uniform and cause defective products.

According to the present invention, since the nylon and aramid primarily-twisted yarns have the same twist number, i) the primary twisting and secondary twisting can be performed simultaneously so that the manufacturing process can be simplified, ii) defective twist that might be caused during the twisting process can be remarkably reduced, and iii) the nylon primarily-twisted yarn 110 and aramid primarily-twisted yarn 120 can have identical structure, i.e., the ply yarn 100 can have a stable overall structure, and thus the non-uniformity of the properties and defective products that might be caused to the conventional hybrid fiber cord due to the loop and shape non-uniformity can be remarkably reduced.

To make the nylon primarily-twisted yarn 110 and aramid primarily-twisted yarn 120 have structures substantially identical with each other as illustrated in FIG. 2, the tension applied respectively to the nylon and aramid filaments having different modulus during the twisting process may be adjusted appropriately.

The ply yarn 100 obtained through the twisting process is submerged into and passes through an adhesive solution to improve its adhesiveness with a tire, and then is dried and heat-treated to complete the hybrid fiber cord of the present invention.

The adhesive solution may be, but not limited to, RFL (Resorcinol Formaldehyde Latex) solution or epoxy-based adhesive solution which are typically used in this art as an adhesive solution for a tire cord.

Although the temperature and time of the drying process subsequent to the submerging process depend on the composition of the adhesive solution, it can be performed at 70 to 200° C. for 30 to 120 seconds.

The heat-treating process can be performed 200 to 250° C. for 30 to 120 seconds.

The adhesive component of the adhesive solution impregnated in the ply yarn during the previous process is coated on the surface of the ply yarn through the drying and heat-treating processes so that the adhesiveness of the ply yarn with the rubber compositions for a tire can be increased.

Although the same twist number is applied to both primary twist and second twist when the hybrid fiber cord of the present invention is made, the untwisting phenomenon might occur during the drying process subsequent to the submerging process, thereby causing the twist number difference of 15% or less between the primary twist and second.

The hybrid fiber cord made through the aforementioned method has breaking tenacity of 8.0 to 15.0 g/d, elongation at break of 7 to 15%, and dry heat shrinkage of 1.5 to 2.5%, the breaking tenacity and elongation at break being measured according to ASTM D885, and the dry heat shrinkage being measured by applying primary load of 0.01 g/De' at 180° C. for 2 minutes.

The difference between the maximum and minimum breaking tenacities of the hybrid fiber cords made according to the present invention under the same conditions is less than 1 g/d, and the difference between the maximum and minimum elongations at break of the hybrid fiber cords made according to the present invention under the same conditions is less than 3%.

The hybrid fiber cord of the present invention has strength retention rate of 80% or more after the disc fatigue test performed according to JIS-L 1017 method of Japanese Standard Association.

It is desirable to apply the hybrid fiber cord to the cap ply to prevent the tire belt portion from being deformed during high-speed driving so that the flat spot problem which might occur to the tire adopting the conventional nylon-based fiber cord can be efficiently prevented.

Since the hybrid fiber cord comprises both an expensive aramid filament of excellent properties and an inexpensive nylon filament, it is inexpensive compared to the conventional fiber cord consisting only of the aramid filaments, the defect rate decreases, the productivity increases, and thus the competitiveness thereof as a product can be increased.

Hereinafter, the examples of the present invention and comparative example will be described to explain the present invention in detail. Since the following examples are provided only for better understanding of the present invention, the scope of the present invention should not be limited thereto.

Example 1

The primary twisting and secondary twisting were performed simultaneously with a nylon filament of 1260 De' and an aramid filament of 1500 De' by means of the Cable Corder twister to produce a hybrid ply yarn. The primary twisting was performed in the counterclockwise direction and the secondary twisting was performed in the clockwise direction. The twister was set to the twist number of 300 TPM.

The hybrid ply yarn so obtained was submerged into a resorcinol formaldehyde latex (RFL) adhesive solution comprising 2.0 wt. % of resorcinol, 3.2 wt. % of formalin (37%), 1.1 wt. % of sodium hydroxide (10%), 43.9 wt. % of styrene/butadiene/vinylpyridine (15/70/15) rubber (41%), and water. The tension applied to the hybrid ply yarn during the dipping process was 0.5 kg/cord.

Subsequently, the hybrid ply yarn to which the RFL solution was impregnated through the dipping process was dried at 150° C. for 100 seconds and then heat-treated at 240° C. for 100 seconds so as to complete a hybrid fiber cord.

Example 2

A hybrid fiber cord was made in the same manner as that of the Example 1 except that a nylon filament of 840 De' and an aramid filament of 1000 De' were used and, to redeem the relative low fineness, the twister was set to the relatively high twist number of 350 TPM.

Example 3

A hybrid fiber cord was made in the same manner as that of the Example 1 except that the twister was set to the twist number of 350 TPM.

Comparative Example

A hybrid fiber cord was made in the same manner as that of the Example 1 except that the nylon filament and aramid filament were primarily twisted at 300 TPM and 400 TPM respectively to produce the nylon primarily-twisted yarn and aramid primarily-twisted yarn, and then the secondary twisting was performed by means of the Ring-Twister to produce a ply yarn where the nylon primarily-twisted yarn was covered by the aramid primarily-twisted yarn.

The hybrid fiber cords finally obtained in the Examples and Comparative Example were evaluated for breaking tenacity and non-uniformity thereof, elongation at break and non-uniformity thereof, dry heat shrinkage, and strength retention rate after disc fatigue test in accordance with the following methods, and the results thereof are shown in the following Table 1.

Breaking Tenacity and Non-Uniformity Thereof & Elongation at Break and Non-Uniformity Thereof The strength at break and elongation at break of the hybrid fiber cord were measured respectively according to ASTM D885 by applying the tensile velocity of 30 m/min to 10 samples having the length of 250 mm using the Instron Tester (Instron Engineering Corp., Canton, Mass.). Then, the strength at break of each sample was divided by the total fineness of the hybrid fiber cord to obtain the breaking tenacity (g/d) of the sample. Then, the breaking tenacity and elongation at break of the hybrid fiber cord were obtained by calculating the averages of breaking tenacities and elongations at break of the 10 samples.

Further, the non-uniformity of the breaking tenacity and non-uniformity of the elongation at break of the hybrid fiber cord were obtained by calculating the difference between the maximum and minimum breaking tenacities among the 10 samples and the difference between the maximum and minimum elongations at break among the samples.

Dry Heat Shrinkage (%)

After being left at the temperature of 25° C. and relative humidity of 65% for 24 hours, the dry heat shrinkage of the hybrid fiber cord was measured by applying primary load of 0.01 g/De' thereto at 180° C. for 2 minutes using Testrite apparatus.

Strength Retention Rate after Disc Fatigue Test

After the strength (i.e., strength before fatigue) of a hybrid fiber cord was measured, the hybrid fiber cord and rubber were vulcanized together to produce a sample. Then, according to JIS-L 1017 method of Japanese Standard Association, the fatigue was applied to the sample by means of the disc fatigue tester which repeated the stretching and contracting steps for 8 hours at 80° C. while rotating the sample at 2500 rpm. Subsequently, the rubber was removed from the sample and the strength after fatigue of the hybrid fiber cord was measured. The strength retention rate defined as the following Equation 1 was calculated with the strength before fatigue and strength after fatigue:

Strength retention rate (%)=[Strength after fatigue (kgf)/Strength before fatigue (kgf)]100      <Equation 1> wherein the strengths (kgf) before and after fatigue were obtained respectively by measuring the strength at break of the hybrid fiber cord according to ASTM D885, i.e., applying the tensile velocity of 30 m/min to the sample having the length of 250 mm using the Instron Tester (Instron Engineering Corp., Canton, Mass.).

TABLE 1

|  | Ex. 1 Nylon 1260De: Aramid 1500De | Ex. 2 Nylon 840De: Nylon 1000De | Ex. 3 Nylon 1260De: Aramid 1500De | Comp. Ex. Nylon 1260De: Aramid 1500De |
|---|---|---|---|---|
| Twist Number (TPM) | 300 | 350 | 350 | 300/400 |
| Breaking Tenacity (g/d) | 13.4 | 13.2 | 11.7 | 8.7 |
| Non-uniformity of Breaking Tenacity (g/d) | 0.3 | 0.2 | 0.2 | 3.1 |
| Elongation at break (%) | 11.5 | 11 | 13.3 | 12.1 |
| Non-uniformity of Elongation at break (%) | 1.6 | 1.2 | 1.8 | 5.1 |
| Dry heat shrinkage (%) | 2.1 | 1.9 | 2.2 | 0.1 |
| Strength retention rate (%) | 93.2 | 94.3 | 91.7 | 72.4 |

It is shown that the hybrid fiber cord of the Comparative Example has the loop, exhibits non-uniformity of shape, and has generally worse properties than those of the Examples. To speak more particularly, the damage and shape-disorder of the aramid filament cause the significant strength difference between the samples, and the non-uniformity of the structure of the aramid primarily-twisted yarn covering the nylon primarily-twisted yarn causes the significant elongation difference between the samples. Further, since different forces are applied, during the fatigue test, to the samples within the rubber composition due to the non-uniform properties thereof, the strength retention rate thereof is much lower than those of the Examples.

The invention claimed is:

1. A hybrid fiber cord comprising:
   a nylon primarily-twisted yarn having a first twist number of 300 to 500 TPM;
   an aramid primarily-twisted yarn having a second twist number of 300 to 500 TPM; and
   an adhesive,
   wherein the first twist number is identical with the second number,
   wherein the nylon primarily-twisted yarn and the aramid primarily-twisted yarn are secondarily-twisted together at a third twist number which is identical with the first and second twist numbers and have identical structures with each other in the hybrid fiber,
   wherein the nylon primarily-twisted yarn and aramid primarily-twisted yarn which are secondarily-twisted together with the identical twist number form a 2-ply secondarily-twisted yarn consisting of 1-ply nylon primarily-twisted yarn and 1-ply aramid primarily-twisted yarn, and
   wherein the secondarily-twisted yarn is coated with the adhesive, and the secondarily-twisted yarn coated with the adhesive has a strength retention rate of 80% or more after a disc fatigue test is performed according to JIS-L 1017 method of Japanese Standard Association, and has a dry heat shrinkage of 1.5 to 2.5%.

2. The hybrid fiber cord of claim 1, wherein weight ratio of the nylon primarily-twisted yarn to the aramid primarily-twisted yarn is 20:80 to 80:20.

3. The hybrid fiber cord of claim 1, wherein the hybrid fiber cord has breaking tenacity of 8.0 to 15.0 g/d and elongation at break of 7 to 15%, the breaking tenacity and elongation at break being measured according to ASTM D885 (2004).

4. A method for manufacturing a hybrid fiber cord, the method comprising:
- a first step for primarily-twisting a nylon filament at a first twist number of 300 to 500 TPM to produce a nylon primarily-twisted yarn;
- a second step for primarily-twisting an aramid filament at a second twist number of 300 to 500 TPM to produce an aramid primarily-twisted yarn;
- a third step for secondarily-twisting the nylon and aramid primarily-twisted yarns together at a third twist number to produce a ply yarn in such a way that the nylon and aramid primarily-twisted yarns have identical structures with each other; and
- coating the ply yarn with an adhesive, and the ply yarn coated with the adhesive has a strength retention rate of 80% or more after a disc fatigue test is performed according to JIS-L 1017 method of Japanese Standard Association, and has a dry heat shrinkage of 1.5 to 2.5%,
- wherein the first, second and third twist numbers are identical with each other, and
- wherein the third step produces a 2-ply secondarily-twisted yarn consisting of 1-ply of nylon primarily-twisted yarn and 1-ply of aramid primarily-twisted yarn.

5. The method of claim 4, wherein the first, second and third steps are performed simultaneously and continuously.

6. The method of claim 4, wherein the step of coating the ply yarn with an adhesive comprises:
- submerging the ply yarn into an adhesive solution;
- drying the ply yarn having the adhesive solution impregnated therein; and
- heat-treating the dried ply yarn.

7. The method of claim 6, wherein the adhesive solution comprises Resorcinol-Formaldehyde-Latex adhesive.

* * * * *